Oct. 9, 1923.
R. G. KNOWLAND
1,470,084
METHOD OF DEOXIDIZING WATER
Filed Aug. 20, 1919
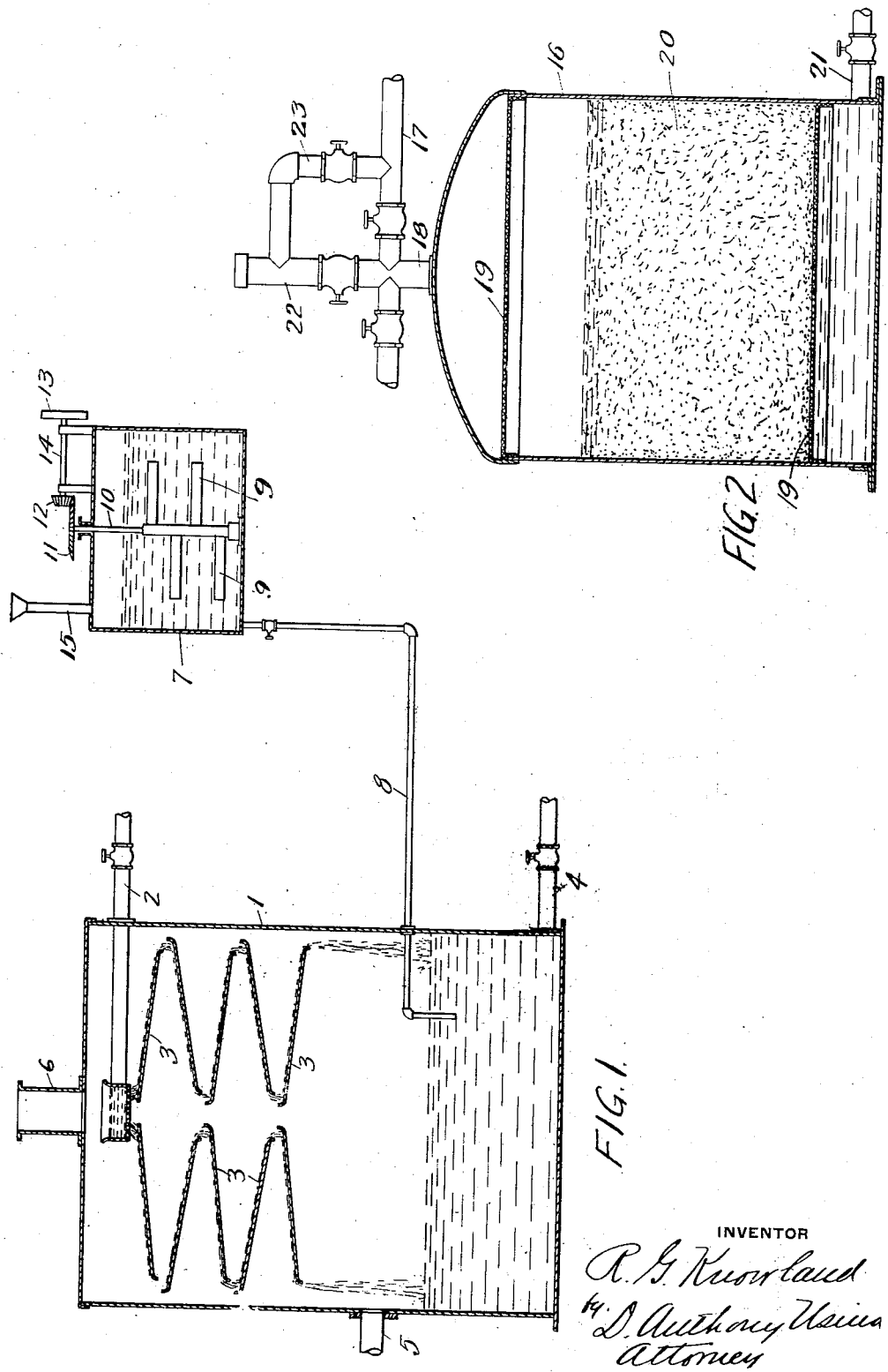
INVENTOR Patented Oct. 9, 1923.

1,470,084

UNITED STATES PATENT OFFICE.

RICHARD G. KNOWLAND, OF BOSTON, MASSACHUSETTS.

METHOD OF DEOXIDIZING WATER.

Application filed August 20, 1919. Serial No. 318,693.

*To all whom it may concern:*

Be it known that I, RICHARD G. KNOWLAND, a citizen of the United States, and resident of Boston, in the county of Suffolk and State of Massachusetts, have invented certain new and useful Improvements in Methods of Deoxidizing Water, of which the following is a specification.

My invention relates to a method of deoxidizing water by removing the dissolved oxygen therefrom and thereby deactivating the water and lessening its corrosive properties.

One object of the invention is to provide a method of freeing water of dissolved oxygen by a suitable chemical action, in which the reagent receives the free oxygen of the water into composition and becomes itself oxidized, and thereby decreasing the corrosive action of the water upon piping systems, steam heating apparatus, or other conductors or containers.

Another object of the invention is to provide an improved method of removing the dissolved oxygen from water whereby the deactivating operation is accelerated and the time required to remove the dissolved oxygen is materially lessened.

Another object of the invention is to provide a method wherein a suitable, and but slightly soluble, reagent is added to the water to be purified during a filtering operation, and the resulting substantially insoluble substances formed by oxidation filtered out of the water during the operation.

A further and specific object of the invention is to deoxidize water by the use of ferrous salts employed in a quantity sufficient to act as an effective reagent to eliminate the oxygen, and not merely as a coagulant.

In the accompanying drawings, Figure 1 is an elevation of a water heater and connections thereto for adding the deoxidizing substance to the water;

Figure 2 is an elevation of a filter for employing my method of chemical deoxidation of the water during filtering.

For deoxidizing the water, a ferrous salt is added in such quantity as to combine with substantially all the free, dissolved oxygen in the water to be deoxidized. The salts preferably employed are ferrous sulfate ($FeSO_4$) ferrous hydroxide ($Fe(OH)_2$), or ferrous carbonate ($FeCO_3$). Of these salts, the ferrous sulfate is the most readily soluble, but the less soluble ferrous hydroxide and ferrous carbonate give results as favorable as those obtained with the sulfate. For household and similar purposes, the ferrous hydroxide is preferred, as it forms, by its oxidation, the even less soluble ferric hydroxide ($Fe(OH)_3$), which may be readily filtered out before the water is used.

In performing the deoxidation in the manner shown in Figure 1, the water to be treated enters the heater 1 by way of a pipe 2 from any suitable source of supply and, after passing over baffles 3, collects in the bottom of the heater from which it is led off from time to time by means of the discharge or outlet pipe 4. A valve controlled steam inlet 5 on the heater supplies the steam used in heating the water within the heater 1, and the heater is also supplied with a vent 6 opening into the atmosphere. The solution of the ferrous salt is made up in the agitator or solution tank 7, and is delivered by means of the valved pipe 8 into the water in the bottom of the heater. The solution in the tank 7 is made by dissolving therein ferrous sulfate or ferrous hydroxide. The paddles 9 on the vertical shaft 10 provide means for stirring or agitating the solution, the shaft being driven through the bevel gears 11, 12 and pulley 13 on the shaft 14. The valve controlled inlet pipe 15 affords means for supplying liquid to the tank 7. When ferrous hydroxide is employed, it may be introduced itself or may be formed in the heater 1 by introducing ferrous sulfate ($FeSO_4$), and calcium hydroxide ($Ca(OH)_2$) or sodium hydroxide ($NaOH$) from another suitable source of supply as from a second tank similar to the tank shown. When ferrous salts are added to the cold water these substances react to form the ferrous hydroxide ($Fe(OH)_2$) and calcium sulfate ($CaSO_4$). As the solubility of calcium sulfate decreases with increase of temperature above 38° C., the greater proportion of this product will be precipitated in the heater and may be readily removed by subsequent filtering, if so desired.

In a system in which the water is under pressure, ferrous salts may be added proportionately to the flow of the water, by providing suitable mechanism for feeding the chemicals into the water. In this modification, water from a heater, or any other source, is run into a filter 16 by means of the supply pipe 17 and the pipe 18 on the filter. The filter is provided with a pair of screens 19 of usual construction, between which is laid the filter bed 20. The water which passes through the filter bed may be drawn off as desired by way of the outlet pipe 21. On top of, or mixed with, the upper stratum of sand in the filter bed, is the ferrous hydroxide employed as the deoxidizing agent. As the ferrous hydroxide is only slightly soluble, it will dissolve gradually to act upon the water as it percolates through the upper portion of the filter bed. The portion of the ferrous hydroxide entering into combination with the free oxygen of the water will become oxidized and will be precipitated as the substantially insoluble ferric hydroxide ($Fe(OH)_3$). This ferric hydroxide is filtered out of the water during its passage through the filter bed. In order that a fresh supply of ferrous hydroxide may be introduced at intervals, the pipe 18 on the filter is provided with a capped chamber 22 located above the point at which it connects with the water supply pipe 17, and a valved by-pass 23 is provided from the water supply pipe 17 to the chamber 22 containing the ferrous hydroxide. By running water through the by-pass 23 into the chamber 22, and then through the pipe 18 into the filter 16, fresh hydroxide may be added from time to time to the charge in the filter.

Within certain limits, the deoxidizing effect of the ferrous salt on the water varies directly with the quantity of the salt employed and the length of time through which it is permitted to act upon the water. As the action is extremely rapid, the length of time required is very brief. A series of tests made on water at a temperature of 22 degrees centigrade, identical results being obtained with the ferrous sulfate and the ferrous hydroxide, illustrate this action. Thus water having an oxygen content of 5.20 cubic centimeters per liter was treated for one hour and for three minutes, respectively, with 0.35 gram of the reagent per liter of water, this being the theoretical amount requisite assuming that all of the reagent enters into combination with the free oxygen of the water.

The treatment, which was continued for one hour, reduced the content of free oxygen to 0.08 c. c. per liter, while the one continued for three minutes reduced the free oxygen content of the water to 0.06 c. c. per liter, or substantially the same as for the one hour period. This instance shows that the time needed for the removal of the oxygen is very short.

In another test, water containing a free oxygen content of 5.75 c. c. per liter was treated at a temperature of 22 degrees centigrade, with varying quantities of the reagent, each treatment continuing for five minutes. With the use of 0.10 gram of the ferrous salt per liter of water, the free oxygen content was decreased from 8.54 c. c. per liter to 6.06 c. c.; with the use of 0.20 gram per liter of water, the treatment decreased the free oxygen content from 8.56 c. c. to 4.03 c. c. per liter, while with the use of 0.43 gram per liter, the theoretically sufficient amount, the treatment decreased the free oxygen content from 8.56 c. c. to 0.14 c. c. per liter. Quantities between these limits showed a progressive decrease with increased quantities of the ferrous salt, and the amount of oxygen removed is directly proportional to the quantity of ferrous salt added.

As the presence of free oxygen in the water in a quantity of .25 c. c. or less per liter of water is practically harmless, the tests above outlined illustrate, not only the most desirable quantities and duration of treatment, but also show the practicability of the method of treatment. Ferrous salts have been previously used in the purification of water as coagulants for removing sediment, and for their action in freeing the water of bacteria. Such use however, has not been for the purpose of freeing the water of dissolved oxygen, nor have the ferrous salts been employed in quantities sufficient to accomplish this purpose.

The advantage of the invention will be readily appreciated by those skilled in the art to which it pertains, and as a number of modifications may be made in the manner of performing the method, without departing from the spirit of the invention, no limitations, other than those contained in the appended claims, are to be imposed.

I claim:—

1. The method of deoxidizing water which consists in charging the water with ferrous hydroxid in quantities in excess of the amount required to absorb the free oxygen in the water, to thereby remove the free oxygen from the water and form a ferric hydroxid, retaining said treated water within a closed system to prevent the reabsorption of oxygen, and removing the insoluble ferric hydroxid by filtration.

2. The method of deoxidizing water within a closed system comprising a closed heating tank, a closed solution tank and a conduit extending from the solution tank to the heating tank, which consists in charging the water in the heating tank with ferrous hydroxid from the solution tank in quantities in excess of the amount necessary to absorb the free oxygen in the water, to thereby remove the free oxygen from the water and form an insoluble ferric compound, said closed system preventing the reabsorption of oxygen by the water, and filtering out the insoluble compound from the treated water.

3. The method of deoxidizing water within a closed system, which consists in charging the water with ferrous hydroxide in quantities in excess of the amount required to absorb the free oxygen in the water, to thereby remove the free oxygen from the water and form a ferric hydroxide, retaining said treated water within the closed system to prevent reabsorption of the oxygen, and removing the insoluble ferric hydroxide.

In testimony whereof, I have hereunto set my hand.

RICHARD G. KNOWLAND.